(12) United States Patent
Chen et al.

(10) Patent No.: US 12,132,385 B2
(45) Date of Patent: Oct. 29, 2024

(54) CONTROL CIRCUIT, RESONANT CONVERTER AND INTEGRATED CIRCUIT CONTROL CHIP

(71) Applicant: Silergy Semiconductor Technology (Hangzhou) LTD, Hangzhou (CN)

(72) Inventors: Chaojun Chen, Hangzhou (CN); Jian Deng, Hangzhou (CN); Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 189 days.

(21) Appl. No.: 17/868,954

(22) Filed: Jul. 20, 2022

(65) Prior Publication Data

US 2023/0022357 A1 Jan. 26, 2023

(30) Foreign Application Priority Data

Jul. 21, 2021 (CN) .......................... 202110824240.3

(51) Int. Cl.
*H02M 1/00* (2007.01)
*H02M 3/00* (2006.01)

(52) U.S. Cl.
CPC ....... *H02M 1/0019* (2021.05); *H02M 1/0025* (2021.05); *H02M 1/0045* (2021.05); *H02M 3/015* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225;
(Continued)

(56) References Cited

U.S. PATENT DOCUMENTS 6,005,780 A 12/1999 Hua
6,580,258 B2 6/2003 Wilcox et al.
(Continued)

FOREIGN PATENT DOCUMENTS

CN 102231605 A 11/2011
CN 106130378 A 11/2016
CN 107968569 A 4/2018

*Primary Examiner* — Thienvu V Tran
*Assistant Examiner* — Nusrat Quddus

(57) ABSTRACT

A control circuit for a resonant converter, can include: a feedforward circuit configured to generate a feedforward current; a charge feedback circuit configured to receive a resonant current sampling signal representing a resonant current of the resonant converter in a first mode to generate a charge feedback signal, and to receive the resonant current sampling signal and the feedforward current together to generate the charge feedback signal in a second mode; and a driving control circuit configured to generate driving signals according to the charge feedback signal and a first threshold signal, in order to control switching states of power transistors of the resonant converter, where the first threshold signal is generated according to an error compensation signal representing an error information between a feedback signal of an output signal of the resonant converter and a reference signal.

19 Claims, 8 Drawing Sheets

(58) Field of Classification Search
CPC .......... G05F 3/227; G05F 3/245; G05F 3/247;
G05F 3/262; G05F 3/265; G05F 3/267;
G05F 1/575; G05F 1/30; G05F 1/33;
G05F 1/32; G05F 1/34; G05F 1/38;
H02M 5/2573; H02M 1/081; H02M
5/293; H02M 7/12; H02M 3/10; H02M
3/125; H02M 3/13; H02M 3/135; H02M
3/145; H02M 3/15; H02M 3/155; H02M
3/156; H02M 3/158; H02M 3/1588;
H02M 2003/1566; H02M 3/1582; H02M
2003/1557; H02M 3/22; H02M 1/08;
H02M 1/36; H02M 3/24; H02M 3/325;
H02M 3/335; H02M 3/28; H02M
3/33569; H02M 3/33507; H02M
2007/4815; H02M 2007/4818; H02M
1/083; H02M 3/33538; H02M 3/33546;
H02M 3/33515; H02M 3/33576; H02M
3/33592; H02M 3/33553; H02M 3/33523;
H02M 1/12; H02M 3/3155; H02M
7/1557; H02M 7/1626; H02M 1/4208;
H02M 7/53871; H02M 7/219; H02M
7/151; H02M 1/4233; H02M 5/4585;
H02M 7/217; H02M 7/1552; H02M
7/1623; H02M 1/4225; H02M 3/073;
H02M 3/137; H02M 7/10; H02M 7/00;
H02M 7/06; H02M 7/064; H02M 7/068;
H02M 7/519; H02M 7/521; H02M 7/523;
H02M 7/75; H02M 7/757; H02M 7/7575;
H02M 7/66; H02M 7/68; H02M 7/72;
H02M 7/483; H02M 2007/4835; H02M
7/487; H02M 1/084; H02M 1/0845;
H02M 7/515; H02M 7/525; H02M 7/527;
H02M 7/529; H02M 7/539; H05B
39/048; B23K 11/24; H04B 2215/069;
Y02B 70/1491; H02J 7/12
See application file for complete search history.

(56) References Cited

U.S. PATENT DOCUMENTS

| | | | |
|---|---|---|---|
| 9,325,254 B2 | 4/2016 | Deng et al. | |
| 9,331,588 B2 | 5/2016 | Chen | |
| 9,488,680 B2 | 11/2016 | Xu | |
| 9,735,661 B2* | 8/2017 | Halim | H02M 1/12 |
| 10,224,831 B1* | 3/2019 | Hurtado | H03K 17/042 |
| 11,632,045 B2* | 4/2023 | Langeslag | H02M 3/158 |
| | | | 323/282 |
| 11,770,069 B2* | 9/2023 | Liu | H02M 3/01 |
| | | | 363/21.02 |
| 2005/0017695 A1* | 1/2005 | Stanley | H02M 1/4208 |
| | | | 323/207 |
| 2008/0205096 A1* | 8/2008 | Lai | H02M 7/53871 |
| | | | 363/40 |
| 2012/0327692 A1* | 12/2012 | Cantoro | H02M 3/3376 |
| | | | 363/21.02 |
| 2013/0051090 A1* | 2/2013 | Xie | H05B 45/3725 |
| | | | 363/21.17 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2018/0256242 A1* | 9/2018 | Bluvshtein | H02M 7/53871 |
| 2019/0058393 A1* | 2/2019 | Elferich | H05B 45/39 |
| 2020/0267812 A1* | 8/2020 | Deng | H05B 45/37 |
| 2021/0036612 A1* | 2/2021 | Deng | H02M 3/33523 |
| 2021/0143743 A1* | 5/2021 | Deng | H02M 1/083 |
| 2021/0194377 A1* | 6/2021 | Deng | H02J 7/007 |
| 2022/0255438 A1* | 8/2022 | Chen | H02M 3/33507 |
| 2022/0255439 A1* | 8/2022 | Chen | H02M 3/33507 |

* cited by examiner

US 12,132,385 B2

CONTROL CIRCUIT, RESONANT CONVERTER AND INTEGRATED CIRCUIT CONTROL CHIP

RELATED APPLICATIONS

This application claims the benefit of Chinese Patent Application No. 202110824240.3, filed on Jul. 21, 2021, which is incorporated herein by reference in its entirety.

FIELD OF THE INVENTION

The present invention generally relates to the field of power electronics, and more particularly to control circuits and methods, resonant converters, and integrated circuit control chips.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

As compared with switching converters, resonant converters have advantages including low switching loss, high conversion efficiency, and high power density. Resonant converters typically provide two control methods: frequency control and charge control. When the frequency control method for the resonant converter is utilized, due to the limited bandwidth, the dynamic response of the resonant converter can be poor, which affects the system performance. The charge control method directly controls the input charge and the output power, which can simplify the loop structure, is beneficial to the loop compensation design, and can achieve higher bandwidth.

Figure 1:
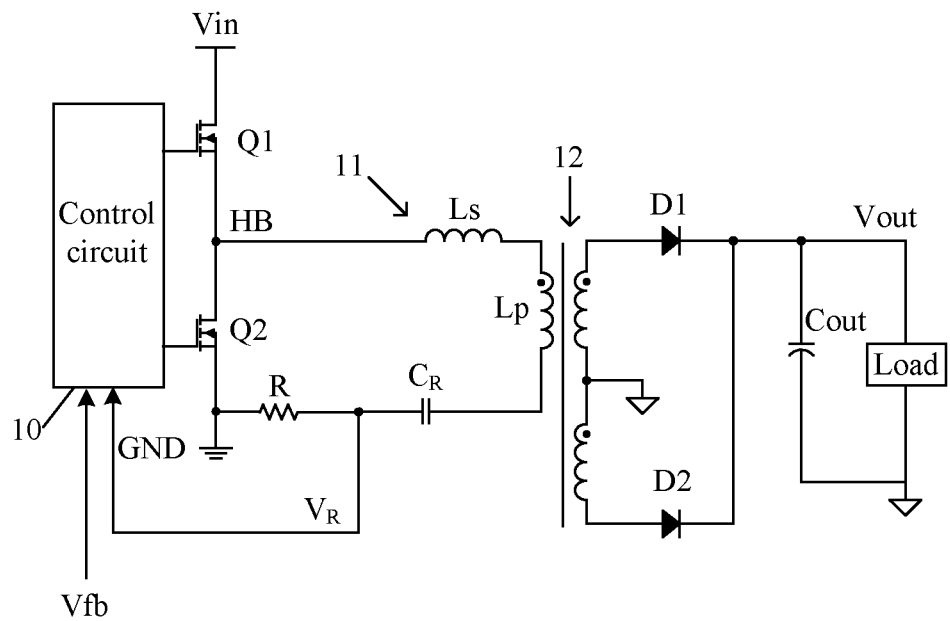
FIG. 1 is a schematic block diagram of an example resonant converter adopting charge control.

Referring now to FIG. 1, shown is a schematic block diagram of an example resonant converter adopting the charge control. In this example, the resonant converter is configured as a half-bridge resonant converter as an example. The half-bridge resonant converter can include power transistors Q1 and Q2 connected in series between input voltage Vin and reference ground GND. Power transistors Q1 and Q2 can be driven by control circuit 10. The resonant converter can also include transformer 12, resonant capacitor $C_R$, and inductor Ls connected in series with primary winding Lp of transformer 12 between common node HB of power transistors Q1 and Q2 and reference ground GND, which may form resonant circuit 11. The two secondary windings of transformer 12 can respectively be connected with diodes D1 and D2 to form a full-wave rectifier circuit. The cathodes of diodes D1 and D2 may both connect to an output terminal of the resonant converter. Output capacitor Cout and the load can connect in parallel between the output terminal of the resonant converter and the secondary reference ground, in order to generate output voltage Vout at the output terminal of the resonant converter. In addition, the resonant converter can also include resistor R, which can connect in series in resonant circuit 11 to sample a resonant current, thereby obtaining sampling voltage $V_R$ representing the input charge. Control circuit 10 can control the output power according to sampling voltage $V_R$ and output feedback signal Vfb.

When the output power of the resonant converter decreases, the window size of the charge control may decrease to the minimum value. In order to improve the efficiency at light load, a burst mode may generally be entered. The resonant converter can operate continuously for several cycles and then shut down several times according to the load conditions, in order to reduce the output power. However, this approach can cause transformer noise and flickering problems in light-emitting diode (LED) applications.

Figure 2:
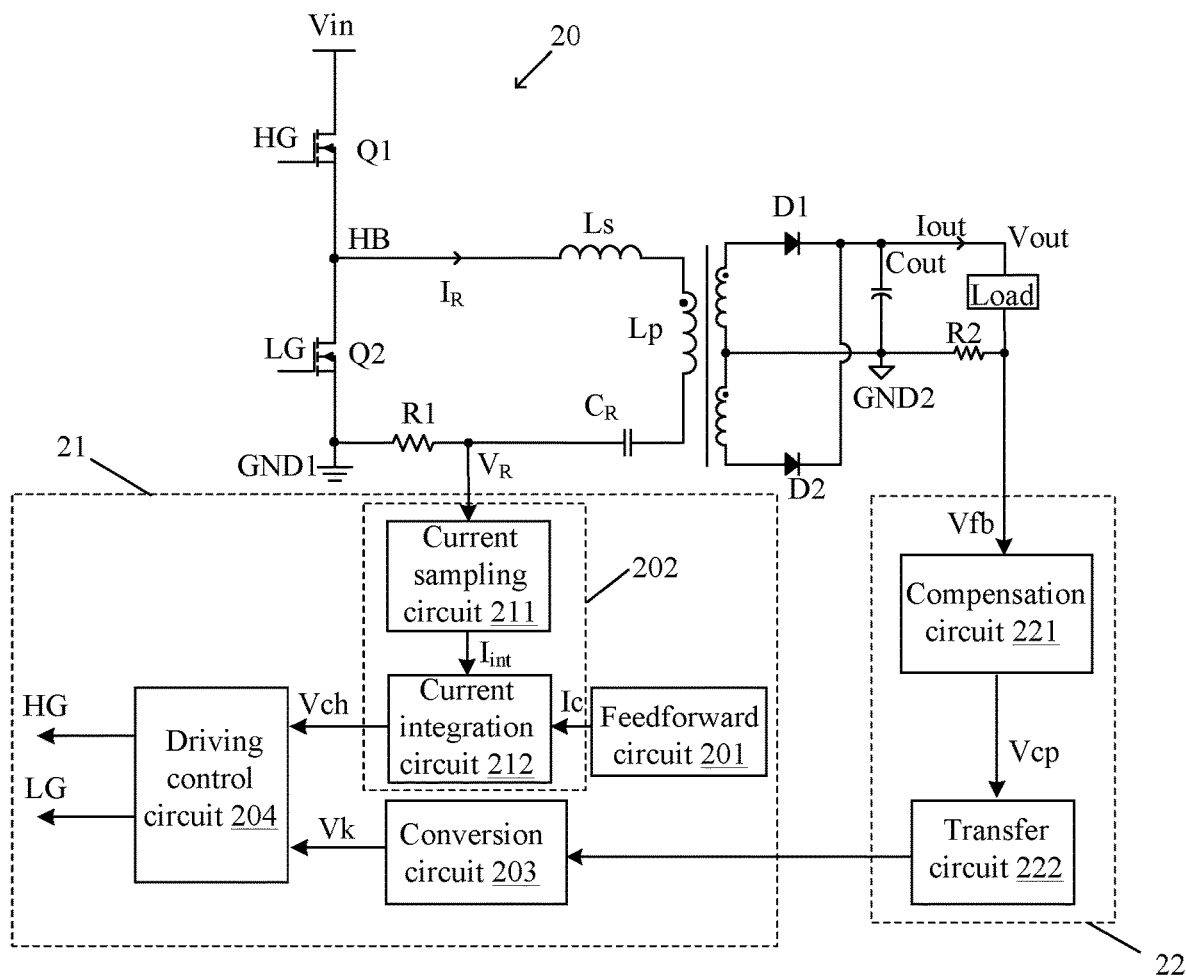
FIG. 2 is a schematic block diagram of an example resonant converter, in accordance with embodiments of the present invention.

Referring now to FIG. 2, shown is a schematic block diagram of an example resonant converter, in accordance with embodiments of the present invention. In this particular example, the resonant converter can include main power circuit 20, control circuit 21 at a primary side, and output feedback circuit 22 at a secondary side. Here, main power circuit 20 is described by taking a half-bridge resonant converter structure as an example, which can include power transistors Q1 and Q2 connected in series between input voltage Vin and primary side reference ground GND1, and a resonant unit. The resonant unit can include inductor Ls, primary winding Lp of the transformer, and resonant capacitor $C_R$ connected in series between common node HB of power transistors Q1 and Q2 and primary side reference ground GND1, such that when a corresponding one of the power transistors is turned on, the resonant unit may be formed.

In this example, resistor R1 can connect in series in the resonant unit to sample resonant current $I_R$. Further, a first terminal of resistor R1 can connect to resonant capacitor $C_R$, and a second terminal of resistor R1 can connect to primary side reference ground GND1. It should be understood that inductor Ls may be the leakage inductor of primary winding Lp or an additional auxiliary inductor, and the positions of inductor Ls and resonant capacitor $C_R$ are not limited to those shown, and may be connected in series in the resonant unit in any event. The transformer can include two secondary windings at the secondary side, which can respectively be connected with diodes D1 and D2 to form a full-wave rectifier circuit. The cathodes of diodes D1 and D2 can connect to the output terminal of the resonant converter. Output capacitor Cout and the load can connect in parallel between the output terminal of the resonant converter and secondary side reference ground GND2.

Output feedback circuit 22 can perform integration compensation according to an error between feedback signal Vfb representing the output signal (e.g., the output voltage or the output current) of the resonant converter and a reference signal, in order to generate error compensation signal Vcp and transmit it to control circuit 21 at the primary side. Further, output feedback circuit 22 can include compensation circuit 221 and transfer circuit 222. Compensation circuit 221 can generate error compensation signal Vcp at the secondary side according to the error between feedback signal Vfb and the reference signal. Transfer circuit 222 can transmit the information of error compensation signal Vcp generated at the secondary side to control circuit 21 at the primary side. For example, transfer circuit 222 can convert error compensation signal Vcp into error current signal $I_{FBL}$ in the form of a current and transmits it to the primary side. It should be understood that the output signal here may be output voltage Vout or output current Iout, and the control object may be determined according to particular requirements of constant current output or constant voltage output. Here, the sampled output current Iout is taken as an example for description by connecting resistor R2 in series between the load and secondary side reference ground GND2.

Control circuit 21 can include feedforward circuit 201, charge feedback circuit 202, conversion circuit 203, and driving control circuit 204. Charge feedback circuit 202 can integrate resonant current sampling signal $V_R$ representing resonant current $I_R$ of the resonant converter in a first mode, in order to generate charge feedback signal Vch. In a second mode, resonant current sampling signal $V_R$ and feedforward current Ic generated by feedforward circuit 201 can be integrated together to generate charge feedback signal Vch. Further, in the first mode, feedforward circuit 201 can be disabled, and feedforward current Ic may not be generated; in the second mode, feedforward circuit 201 can be enabled to generate feedforward current Ic. In the first mode, control circuit 21 may be in the charge control mode, in order to adjust the output power of the resonant converter by changing the input charge of the resonant converter, while the switching frequency of the resonant converter remains unchanged. In the second mode, due to the addition of the feedforward compensation, control circuit 21 can transition from the charge control mode to the equivalent frequency control mode, and may further adjust the output power of the resonant converter by changing the switching frequency of the resonant converter.

In one example, charge feedback circuit 202 can include current sampling circuit 211 and current integration circuit 212. Current sampling circuit 211 can receive resonant current sampling signal $V_R$ and convert it into integration current $I_{int}$ in the form of a current. Here, integration current $I_{int}$ and resonant current $I_R$ may have a same variation trend. Current integration circuit 212 can connect to the output terminal of current sampling circuit 211, and may integrate integration current $I_{int}$ and feedforward current Ic generated by feedforward circuit 201 according to different operation modes, in order to generate charge feedback signal Vch. In one control manner, for each switching cycle, current integration circuit 212 can integrate integration current $I_{int}$ only within half of the switching cycle. In another control manner, for each switching cycle, current integration circuit 212 can integrate integration current $I_{int}$ over the entire switching cycle. A detailed example control method will be explained below.

It should be understood that the resonant converter can also include a current acquisition circuit to sample resonant current $I_R$. In this example, the current acquisition circuit may sample the resonant current by connecting resistor R1 in series in the resonant unit, and resonant current sampling signal $V_R$ can be generated at one terminal of resistor R1. It should be understood that other current acquisition circuits capable of realizing the above functions can be used certain embodiments. For example, the current acquisition circuit can include a series-connection of a capacitor and a resistor connected in parallel at both terminals of resonant capacitor $C_R$, whereby the capacitance value of the capacitor is smaller than that of resonant capacitor $C_R$, and resonant current sampling signal $V_R$ generated across the resistor has the same change tangency as resonant current $I_R$, and has a smaller value, thereby reducing the loss of the sampling resistor.

In one example, conversion circuit 203 can convert the signal output from transfer circuit 222 into threshold signal Vk according to a corresponding relationship, whereby the change trend of threshold signal Vk and error compensation signal Vcp are the same. For example, driving control circuit 204 can generate driving signals HG and LG according to charge feedback signal Vch and threshold signal Vk, in order to control the switching states of power transistors Q1 and Q2 respectively. Driving control circuit 204 can control switching states of power transistors Q1 and Q2 by comparing charge feedback signal Vch against threshold signal Vk to generate a corresponding driving signal, thereby controlling the resonant converter to realize energy conversion. Driving signals HG and LG may be complementary, and the conduction period of power transistors Q1 and Q2 may be the same, which can be substantially equal to half of the switching cycle.

It should be understood that in order to prevent power transistors Q1 and Q2 from being turned on at the same time, dead time may be reserved between driving signals HG and LG. That is, when power transistor Q1 is turned off, power transistor Q2 can be turned on after the dead time; and when power transistor Q2 is turned off, power transistor Q1 may be turned on after the dead time. For example, the above-mentioned feed-forward circuit 201, charge feedback circuit 202, conversion circuit 203, and driving control circuit 204 can be integrated in the same integrated circuit control chip. A first input pin of the integrated circuit control chip may receive resonant current sampling signal $V_R$, and a second input pin of the integrated circuit control chip may receive a signal (e.g., error current signal $I_{FBL}$) containing the information of error compensation signal Vcp transmitted by transfer circuit 222.

Figure 3:
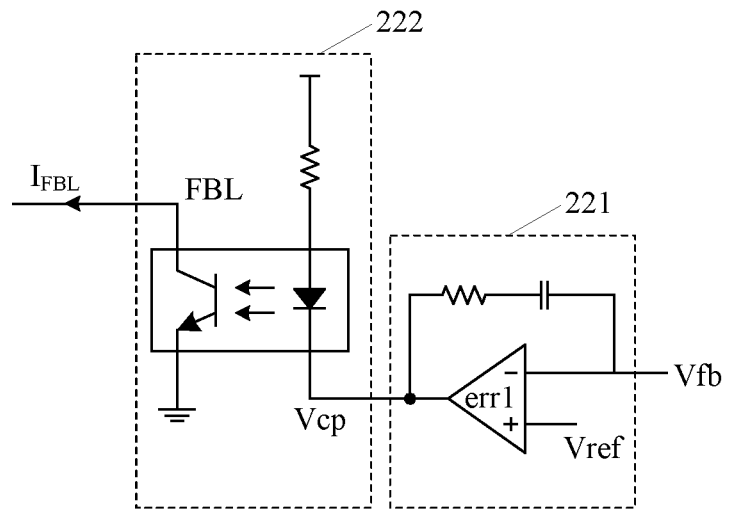
FIG. 3 is a schematic block diagram of an example output feedback circuit in the control circuit, in accordance with embodiments of the present invention.

Referring now to FIG. 3, shown is a schematic block diagram of an example output feedback circuit in the control circuit, in accordance with embodiments of the present invention. Compensation circuit 221 in output feedback circuit 22 can include error amplifier err1, which may receive feedback signal Vfb and reference signal Vref, respectively, and a compensation network that can connect between the inverting input terminal and the output terminal of error amplifier err1. In this example, the compensation network can include a resistor and a capacitor connected in series to form a negative feedback loop, such that the error between feedback signal Vfb and reference signal Vref can be integrally compensated to generate error compensation signal Vcp. Transfer circuit 222 can be implemented with an opt-coupler to convert error compensation signal Vcp into error current signal $I_{FBL}$ and transmit it to the primary side, whereby output terminal FBL of the opt-coupler can connect to the second input pin of the integrated circuit control chip. Further, conversion circuit 203 in the control circuit can generate threshold signal Vk by the corresponding relationship according to error current signal $I_{FBL}$. In this example, conversion circuit 203 can generate threshold signal Vk according to a preset power curve related to error current signal $I_{FBL}$ and threshold signal Vk.

Figure 4:
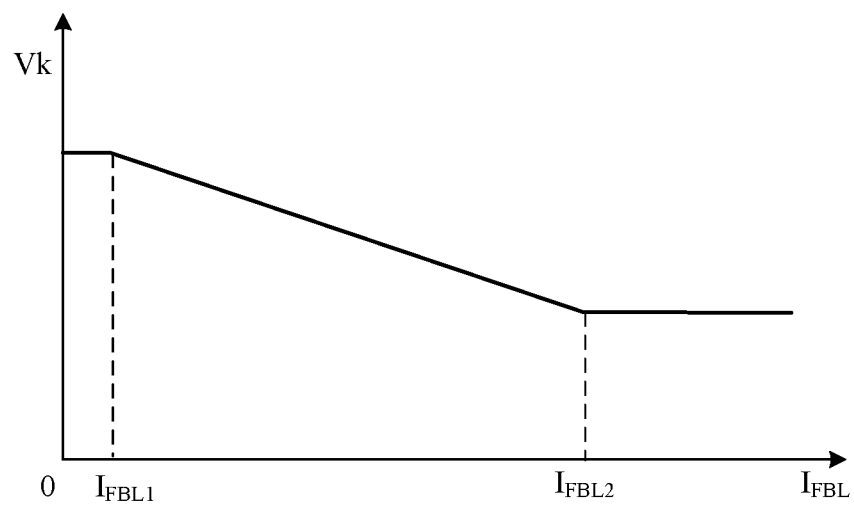
FIG. 4 is a waveform diagram of an example preset power curve in the control circuit, in accordance with embodiments of the present invention.

Referring now to FIG. 4, shown is a waveform diagram of an example preset power curve in the control circuit, in accordance with embodiments of the present invention. In this particular example, in a first current interval (e.g., interval $0$-$I_{FBL1}$), threshold signal Vk may remain unchanged. In a second current interval (e.g., interval $I_{FBL1}$-$I_{FBL2}$), threshold signal Vk can decrease with the increase of error current signal $I_{FBL}$. In some examples, threshold signal Vk may linearly decrease with the increase of error current signal $I_{FBL}$. It should be understood that threshold signal Vk may also be non-linearly decreased. In a third current interval, that is, after error current signal $I_{FBL}$ is greater than current $I_{FBL2}$, threshold signal Vk may remain unchanged. It should be understood that the power curve can be designed according to any particular circuit requirements.

In addition, there are many ways for conversion circuit 203 to generate threshold signal Vk according to error current signal $I_{FBL}$ and the preset power curve in certain embodiments. For example, conversion circuit 203 may convert error current signal $I_{FBL}$ into a voltage signal first, and then generate threshold signal Vk based on the corresponding power curve and the voltage signal. In addition, conversion circuit 203 can also generate a compensation signal after compensating the error between error current signal $I_{FBL}$ and a reference signal, and may then generate threshold signal Vk based on the corresponding power curve and the compensation signal. Further, conversion circuit 203 may adopt an analog circuit or a digital circuit to realize the conversion of the power curve, in certain embodiments.

When error current signal $I_{FBL}$ is greater than second current $I_{FBL2}$, threshold signal Vk may be reduced to the minimum value, and thereafter threshold signal Vk can be maintained at the minimum value. As such, the charge control window may not be subsequently changed; that is, the resonant converter may generate minimum output power in charge control mode, and thus may not adopt the charge control method to further reduce output power when less output power is required. Therefore, particular embodiments may further reduce the output power by changing the switching frequency by introducing feedforward compensation to meet the load requirements.

In this example, in the first mode (e.g., before threshold signal Vk is reduced to the minimum value), feedforward circuit 201 may not generate feedforward current Ic, and charge feedback circuit 202 may only integrate the resonant current sampling signal representing the resonant current of the resonant converter to generate charge feedback signal Vch. In the second mode (e.g., after threshold signal Vk is reduced to the minimum value), feedforward circuit 201 may be enabled to generate feedforward current Ic, and can charge feedback circuit 202 can integrate the resonant current sampling signal and feedforward current Ic together, in order to generate charge feedback signal Vch.

Figure 5:
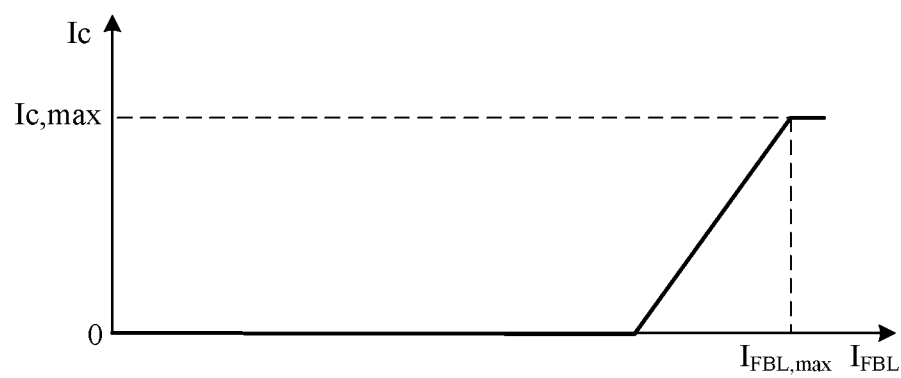
FIG. 5 is a waveform diagram of an example feedforward current generated by the feedforward circuit, in accordance with embodiments of the present invention.

Referring now to FIG. 5, shown is a waveform diagram of an example feedforward current generated by the feedforward circuit, in accordance with embodiments of the present invention. In this particular example, before error current signal $I_{FBL}$ reaches current $I_{FBL2}$, feedforward current Ic may not be generated and not added into the control circuit. That is, in this interval, charge feedback signal Vch may only be determined by integration current $I_{int}$. After error current signal $I_{FBL}$ is greater than current $I_{FBL2}$, feedforward current Ic may begin to increase with the increase of error current signal $I_{FBL}$, and feedforward current Ic can increase linearly with error current signal $I_{FBL}$.

It should be understood that feedforward current Ic can also increase nonlinearly with error current signal $I_{FBL}$, in certain embodiments. Since the change trend of error current signal $I_{FBL}$ and error compensation signal Vcp are opposite, the change trend of feedforward current Ic can be opposite to the change trend of error compensation signal Vcp, such that the value of feedforward current Ic increases with the decrease of the required output power. Here, current $I_{FBL2}$ is the value of error current signal $I_{FBL}$ corresponding to when threshold signal Vk is reduced to the minimum value. When error current signal $I_{FBL}$ reaches maximum current threshold $I_{FBL,max}$, feedforward current Ic can increase to maximum value Ic,max of the feedforward current, and thereafter feedforward current Ic can keep maximum value Ic,max unchanged.

Figure 6:
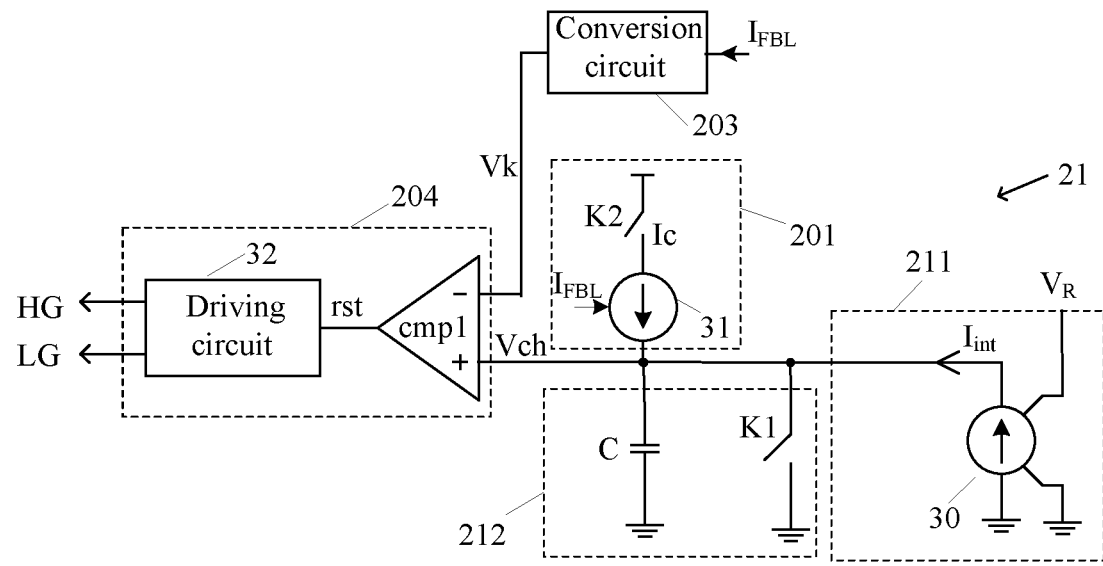
FIG. 6 is a schematic block diagram of a first example control circuit, in accordance with embodiments of the present invention.

Referring now to FIG. 6, shown is a schematic block diagram of a first example control circuit, in accordance with embodiments of the present invention. Elements with the same circuit structure as those in FIG. 2 have the same reference numerals in this example. In each switching cycle, current integration circuit 212 can integrate resonant current $I_R$ only in half of the switching cycle. In the first mode, that is, before threshold signal Vk is reduced to a minimum value, in each switching cycle, control circuit 21 can integrate integration current $I_{int}$ representing resonant current $I_R$ in only half of the switching cycle to generate charge feedback signal Vch. In the second mode, that is, after threshold signal Vk is reduced to the minimum value (e.g., after error current signal $I_{FBL}$ is greater than current $I_{FBL2}$), in each switching cycle, control circuit 21 may only operate the feedforward compensation on resonant current $I_R$ in half of a switching cycle, such that integration current $I_{int}$ representing resonant current $I_R$ and feedforward current Ic can be integrated together to generate charge feedback signal Vch.

Current sampling circuit 211 can also include voltage-controlled current source 30. A first control terminal of voltage-controlled current source 30 may receive resonant current sampling signal $V_R$, and a second control terminal of voltage-controlled current source 30 can connect to the reference ground. Voltage-controlled current source 30 can be controlled by resonant current sampling signal $V_R$ to output integration current $I_{int}$, whereby integration current $I_{int}$ changes with resonant current $I_R$. Current integration circuit 212 can include integration capacitor C and switch K1 connected in parallel. A first terminal of integration capacitor C can connect to an output terminal of voltage-controlled current source 30, and a second terminal of integration capacitor C can connect to the reference ground.

Feedforward circuit 201 may be enabled to generate feedforward current Ic after error current signal $I_{FBL}$ is greater than second current $I_{FBL2}$. When the resonant current is integrated only during the conduction period of power transistor Q1, the direction of feedforward current Ic can be the direction flowing into integration capacitor C. In this case, feedforward circuit 201 can include controlled current source 31 and switch K2 connected in series between the internal power supply and the first terminal of integration capacitor C. Here, controlled current source 31 can be controlled by error current signal $I_{FBL}$, and may generate feedforward current Ic that increases with the increase of error current signal $I_{FBL}$ when switch K2 is turned on.

After feed-forward circuit 201 is enabled, the switching states of switches K1 and K2 can be opposite. When switch K1 is turned off and switch K2 is turned on, integration capacitor C can integrate integration current $I_{int}$ and feed-forward current Ic together, and may generate charge feedback signal Vch at one terminal thereof. When switch K1 is turned on, integration capacitor C may be discharged to zero, and integration current $I_{int}$ and feedforward current Ic may no longer integrated, such that charge feedback signal Vch can be clamped to a low level. It should be understood that the integration time can be controlled by controlling the on and off states of switch K1. Further, switch K1 can be turned off when power transistor Q1 is turned on, and may be turned on when power transistor Q1 is turned off; that is, switch K1 can be controlled by the inverse signal of driving signal HG. In addition, switch K2 can be controlled by driving signal HG, and switch K2 can be turned on when power transistor Q1 is turned on, and turned off when power transistor Q1 is turned off. Therefore, capacitor C may only generate charge feedback signal Vch when driving signal HG is at a high level.

When driving signal HG is at a low level, charge feedback signal Vch can be clamped to a low level until power transistor Q1 is turned on in the next switching cycle. Alternatively, it should be understood that the control of switches K1 and K2 may be implemented in various manners, and any suitable control manner that can achieve the same or similar functionality can be utilized in certain embodiments. In addition, integration of the resonant current during the conduction period of power transistor Q2 may also be performed. At this time, the direction of feedforward current Ic can be the direction flowing out of integration capacitor C; that is, feedforward circuit 201 can include a controlled current source and a switch connected in parallel between the two terminals of integration capacitor C.

In one example, driving control circuit 204 can include a comparison circuit and driving circuit 32. The comparison circuit can generate a signal for controlling power transistor Q1 to be turned off, and power transistor Q1 can be turned on through the dead time after power transistor Q2 is turned off. It should be understood that if the resonant current is integrated during the conduction period of power transistor Q2, the comparison circuit may generate a signal for controlling power transistor Q2 to be turned off. In this example, the comparison circuit can include comparator cmp1 having a non-inverting input terminal for receiving charge feedback signal Vch, and an inverting input terminal for receiving threshold signal Vk generated by conversion circuit 203 according to error current signal $I_{FBL}$.

When charge feedback signal Vch rises to be greater than threshold signal Vk, comparator cmp1 can activate reset signal rst, and driving circuit 32 can control driving signal HG to switch from an active level to an inactive level according to reset signal res, such that power transistor Q1 is turned off. Driving circuit 32 can control power transistor Q2 to be turned on through the dead time after power transistor Q1 is turned off. It should be understood that since the resonant current is only integrated in a half of the switching cycle, driving control circuit 204 may include a timing circuit for timing the conduction time of power transistor Q1, such that power transistor Q2 can be controlled to be turned off when the conduction time of power transistor Q2 is equal to the conduction time of power transistor Q1, and then power transistor Q1 can be controlled to be turned on through the dead time.

Figure 7:
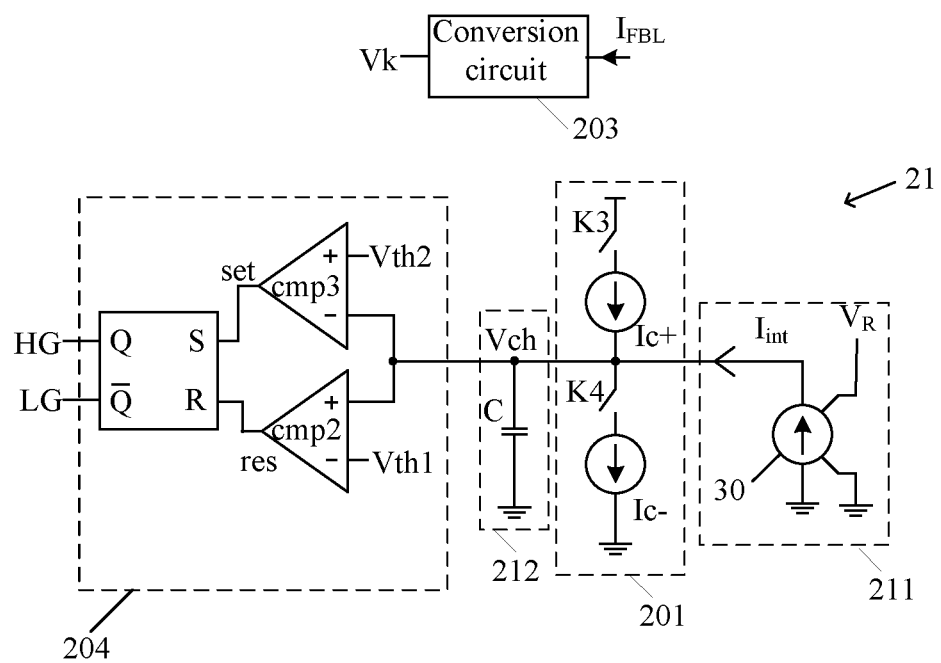
FIG. 7 is a schematic block diagram of a second example control circuit, in accordance with embodiments of the present invention.

Referring now to FIG. 7, shown is a schematic block diagram of a second example control circuit, in accordance with embodiments of the present invention. Elements with the same circuit structure as those in FIG. 2 have the same reference numerals. In each switching cycle, current integration circuit 211 can integrate resonant current $I_R$ in the entire switching cycle as an example for description. In the first mode, that is, before threshold signal Vk decreases to a minimum value, integration current $I_{int}$ can be integrated in each switching cycle to generate charge feedback signal Vch. In the second mode, that is, after threshold signal Vk is reduced to the minimum value (e.g., after error current signal $I_{FBL}$ is greater than current $I_{FBL2}$), in each switching cycle, control circuit 21 may perform feedforward compensation for the resonant current $I_R$, such that integration current $I_{int}$ representing resonant current $I_R$ and feedforward current Ic can be integrated together to generate charge feedback signal Vch.

Current sampling circuit 211 can include voltage-controlled current source 30 having connectivity and functionality the same or substantially the same as in those examples discussed above. Current integration circuit 212 can include integration capacitor C, the first terminal of which can connect to the output terminal of voltage-controlled current source 30, and the second terminal of which can connect to the reference ground. Feed-forward circuit 201 may also be enabled after error current signal $I_{FBL}$ is greater than current $I_{FBL2}$. In this particular example, feedforward circuit 201 can include first and second controlled current sources, both of which generate the same feed-forward current Ic, as described above, and where both the first and second controlled current sources are controlled by error current signal $I_{FBL}$ to generate feedforward current Ic that increases as error current signal $I_{FBL}$ increases. Here, the feedforward current generated by the first controlled current source is designated as Ic+, and the feedforward current generated by the second controlled current source is designated as Ic−, both of which may have the same value.

For example, the first controlled current source and switch K3 can connect in series between the internal power supply and the first terminal of integration capacitor C, so as to generate feedforward current Ic+ flowing into integration capacitor C when switch K3 is turned on, thereby speeding up the integration of integration current $I_{int}$ in the forward direction to control the power transistor to reach the shut-down threshold faster. The second controlled current source can connect in series with switch K4 and can connect in parallel with integration capacitor C, so as to generate feedforward current Ic− flowing out of integration capacitor C when switch K4 is turned on, thereby speeding up the integration of integration current $I_{int}$ in negative direction to control the power transistor to reach the turn-on threshold faster. For example, the switching states of switches K3 and K4 can be opposite, switch K3 may be controlled by driving signal HG, and switch K4 can be controlled by driving signal LG.

Driving control circuit 204 can include a comparison circuit and an RS flip-flop, and here the comparison circuit may generate signals for respectively controlling the turn-on and turn-off of power transistor Q1. The comparison circuit can include comparators cmp2 and cmp3. The non-inverting input terminal of comparator cmp2 may receive charge feedback signal Vch, and the inverting input terminal of comparator cmp2 may receive threshold signal Vth1. When charge feedback signal Vch rises to be greater than threshold signal Vth1, comparator cmp2 can activate reset signal res, such that power transistor Q1 is turned off. The non-inverting input terminal of comparator cmp3 may receive threshold signal Vth2, and the inverting input terminal of comparator cmp3 may receive charge feedback signal Vch. When charge feedback signal Vch drops to be less than threshold signal Vth2, comparator cmp3 can activate set signal set to control power transistor Q1 to be turned on. The comparison circuit can control the action range (e.g., the window of the charge feedback control) of charge feedback signal Vch by setting two threshold signals, whereby threshold signals Vth1 and Vth2 are both generated by threshold signal Vk generated by conversion circuit 203.

In one example, threshold signal Vth1 is the sum of bias signal Vcm and threshold signal Vk (e.g., Vth1=Vcm+Vk), and threshold signal Vth2 is the difference between bias signal Vcm and threshold signal Vk (e.g., Vth2=Vcm−Vk), whereby bias signal Vcm may provide a DC bias to charge feedback signal Vch and threshold signal Vk, such that charge feedback signal Vch varies within a predetermined range. In one example, bias signal Vcm can be generated by sampling input voltage Vin of the resonant converter. For example, bias signal Vcm may be equal to half of input voltage Vin; that is, Vcm=½Vin. In other examples, a bias signal may be provided by other suitable power supplies within the circuitry to meet particular application requirements.

In this example, driving control circuit 204 can include an RS flip-flop. The RS flip-flop may have set terminal S for receiving set signal set, and reset terminal R for receiving reset signal res, in order to generate driving signals HG and LG for controlling power transistors Q1 and Q2. It should be understood that, in order to enhance the driving capability, driving control circuit 204 may also include additional logic circuitry or other forms of circuitry between the output terminal of the RS flip-flop and the control terminal of the power transistor, in order to better control the switching circuit.

Figure 8:
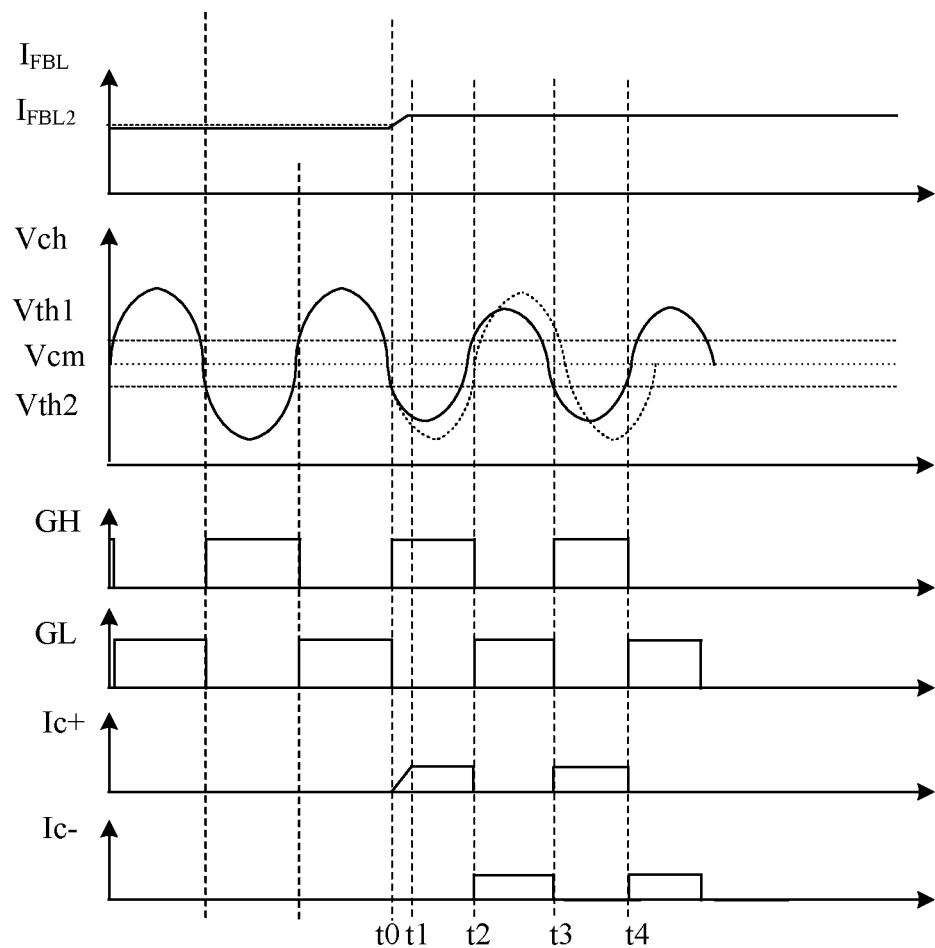
FIG. 8 is waveform diagram of an example operation of the second example control circuit, in accordance with embodiments of the present invention.

Referring now to FIG. 8, shown is waveform diagram of an example operation of the second example control circuit, in accordance with embodiments of the present invention. In this particular example, before time t0, error current signal $I_{FBL}$ may not have yet been greater than current $I_{FBL2}$, so the feedforward compensation may not have been performed yet. That is, feedforward currents Ic+ and Ic− may both be zero, and only the integration current representing the resonant current may integrated to generate charge feedback signal Vch, which can be compared against threshold signals Vth1 and Vth2 to control the switching states of power transistors Q1 and Q2.

At time t0, charge feedback signal Vch can drop to threshold signal Vth2, the driving control circuit may activate the set signal, can control driving signal GH to switch from a low level to a high level, and driving signal GL to switch from a high level to a low level (ignoring dead time). During time period t0-t1, error current signal $I_{FBL}$ may increase and can be greater than current $I_{FBL2}$. Since switch K3 may be controlled to be turned on during this time period, feedforward current Ic+ can act on integration capacitor C together with integration current $I_{int}$. As shown, feedforward current Ic+ may begin to increase with the increase of error current signal $I_{FBL}$. In addition, error current signal $I_{FBL}$ may increase from time t0 to time t1, and then not increase and remain unchanged, so feedforward current Ic+ may also remain unchanged after time t1.

After that, charge feedback signal Vch can continue to drop to the minimum value and then rise, and due to the addition of feedforward current Ic+, charge feedback signal Vch may rise to threshold signal Vth1 faster than that without the feedforward current at time t2. At this time, the driving control circuit may generate a reset signal to control driving signal GH to switch from a high level to a low level, and driving signal GL to switch from a low level to a high level. The dotted line in the FIG. 8 shows the waveform of charge feedback signal Vch without the feedforward compensation, and the solid line shows the waveform of charge feedback signal Vch with the feedforward compensation. As shown, after the feedforward compensation is added, charge feedback signal Vch may reach threshold signal Vth1 faster than before the addition, thus the switching frequency can be increased, and also the high level duration (t0-t2) of driving signal GH may be significantly shorter than the previous cycle.

After time t2, feedforward current Ic− can start to act, and act on the integration capacitor C together with integration current $I_{int}$. Charge feedback signal Vch can continue to rise to the maximum value, and then falls. At time t3, charge feedback signal Vch may fall to threshold signal Vth2. At this time, the driving control circuit may generate a set signal to control driving signal GH to switch from a low level to a high level, and driving signal GL to switch from a high level to a low level. The dotted line in the FIG. 8 shows the waveform of charge feedback signal Vch without feedforward compensation. It can be seen that the addition of feedforward current Ic− makes charge feedback signal Vch drop to threshold signal Vth2 faster, thereby increasing the switching frequency. As shown, the high level duration (t2-t3) of driving signal GL is significantly shortened in this case as compared with the previous cycle.

In this way, the control circuit can maintain the output power by adding the feedforward compensation to increase the switching frequency when less output power is required, such that the control circuit also smoothly transitions from the charge control mode to the equivalent frequency control mode. As shown herein, the half-bridge LLC resonant converter is exemplified. Those skilled in the art will recognize that the resonant converter is not limited to the half-bridge topology, and that a full-bridge resonant converter can also be applied in certain embodiments. In addition, the resonant unit is not limited to LLC, and other resonant units, such as LCCs, may also be utilized in certain embodiments.

In particular embodiments, the resonant current can be sampled and sent to the control circuit for integration to control the charge of the resonant converter, and the feedforward current may be introduced and integrated with the sampled resonant current. When the charge control reaches the minimum output power, the output power can be further reduced, such that the resonant converter smoothly transitions from the charge control to the equivalent frequency control, which can further improve system efficiency and realize a wide output range.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a resonant converter, the control circuit comprising:
   a) a feedforward circuit configured to generate a feedforward current;
   b) a charge feedback circuit configured to receive a resonant current sampling signal representing a resonant current of the resonant converter in a first mode to generate a charge feedback signal, and to receive the resonant current sampling signal and the feedforward current together to generate the charge feedback signal in a second mode;
   c) a driving control circuit configured to generate driving signals according to the charge feedback signal and a first threshold signal, in order to control switching states of power transistors of the resonant converter, wherein the first threshold signal is generated according to an error compensation signal representing an error information between a feedback signal of an output signal of the resonant converter and a reference signal; and
   d) wherein a change tendency of the feedforward current is opposite to a change tendency of the error compensation signal, such that a value of the feedforward current increases as the required output power decreases.

2. The control circuit of claim 1, wherein in the first mode, the feed-forward circuit does not generate the feed-forward current, and the control circuit is in a charge control mode to adjust the output power of the resonant converter by changing the input charge of the resonant converter, while a switching frequency of the resonant converter remains unchanged.

3. The control circuit of claim 1, wherein in the second mode, the feed-forward circuit is enabled to generate the feedforward current, and the control circuit is in an equivalent frequency control mode to adjust the output power of the resonant converter by changing a switching frequency of the resonant converter.

4. The control circuit of claim 1, wherein:
   a) before the first threshold signal decreases to a minimum value, the control circuit operates in the first mode; and
   b) after the first threshold signal reaches the minimum value, the control circuit operates in the second mode.

5. A resonant converter, comprising the control circuit of claim 1, and further comprising:
   a) a main power circuit comprising a first power transistor and a second power transistor connected in series between an input terminal and a reference ground;
   b) a transformer comprising a primary winding and at least one secondary winding;
   c) a resonant capacitor coupled in series with the primary winding to form a resonant unit; and
   d) an output feedback circuit configured to integrate and compensate an error between the feedback signal and the reference signal, in order to generate the error compensation signal to transmit to the control circuit.

6. A control circuit for a resonant converter, the control circuit comprising:
   a) a feedforward circuit configured to generate a feedforward current;
   b) a charge feedback circuit configured to receive a resonant current sampling signal representing a resonant current of the resonant converter in a first mode to generate a charge feedback signal, and to receive the resonant current sampling signal and the feedforward current together to generate the charge feedback signal in a second mode;
   c) a driving control circuit configured to generate driving signals according to the charge feedback signal and a first threshold signal, in order to control switching states of power transistors of the resonant converter, wherein the first threshold signal is generated according to an error compensation signal representing an error information between a feedback signal of an output signal of the resonant converter and a reference signal; and
   d) a conversion circuit configured to receive an error current signal representing the error compensation signal transmitted from a secondary side of the resonant converter, and generate the first threshold signal according to a corresponding relationship.

7. The control circuit of claim 6, wherein the conversion circuit is configured to generate the first threshold signal by a preset power curve according to the error current signal.

8. The control circuit of claim 6, wherein the conversion circuit is configured to convert the error current signal into a voltage signal accordingly, and generate the first threshold signal by a preset power curve according to the voltage signal.

9. The control circuit of claim 6, wherein the conversion circuit is configured to generate a compensation signal according to an error between the error current signal and the reference signal, and accordingly generate the first threshold signal by a preset power curve according to the compensation signal.

10. The control circuit of claim 6, wherein:
    a) when the error current signal is smaller than a first current, the first threshold signal remains unchanged;
    b) when the error current signal is between the first current and a second current, the first threshold signal decreases as the error current signal increases, and the first threshold signal decreases to a minimum value when the error current signal reaches the second current; and
    c) when the error current signal is greater than the second current, the first threshold signal is maintained at the minimum value.

11. The control circuit of claim 6, wherein:
    a) when the error current signal is greater than the second current, the feedforward current increases with the increase of the error current signal until reaching a maximum error current signal; and
    b) the second current is a value of the error current signal at which the first threshold signal decreases to a minimum value.

12. A control circuit for a resonant converter, the control circuit comprising:
    a) a feedforward circuit configured to generate a feedforward current;
    b) a charge feedback circuit configured to receive a resonant current sampling signal representing a resonant current of the resonant converter in a first mode to generate a charge feedback signal, and to receive the resonant current sampling signal and the feedforward current together to generate the charge feedback signal in a second mode;

c) a driving control circuit configured to generate driving signals according to the charge feedback signal and a first threshold signal, in order to control switching states of power transistors of the resonant converter, wherein the first threshold signal is generated according to an error compensation signal representing an error information between a feedback signal of an output signal of the resonant converter and a reference signal; and d) wherein the charge feedback circuit comprises a current sampling circuit configured to receive the resonant current sampling signal and convert to an integration current in the form of a current, and a current integration circuit configured to integrate the integration current and the feedforward current to generate the charge feedback signal.

13. The control circuit of claim 12, wherein the current integration circuit is configured to integrate the integration current for half of a switching cycle in each switching cycle in the first mode, and to integrate the integration current and the feedforward current for half of the switching cycle in each switching cycle in the second mode.

14. The control circuit of claim 13, wherein the current integration circuit is configured to generate the charge feedback signal across an integration capacitor by the integration current and the feedforward current during a first half of the switching cycle in the second mode, and the integration capacitor is controlled to discharge to zero during a second half of the switching cycle.

15. The control circuit of claim 14, wherein in the second mode:

a) when the integration current and the feed-forward current are integrated during a conduction period of a first power transistor of the resonant converter, a direction of the feedforward current equals a direction flowing into the integration capacitor; and b) when the integration current and the feedforward current are integrated during a conduction period of a second power transistor of the resonant converter, a direction of the feedforward current equals a direction flowing out of the integration capacitor, c) wherein the first power transistor and the second power transistor are connected in series between an input terminal and a reference ground.

16. The control circuit of claim 12, wherein the current integration circuit is configured to integrate the integration current over the entire switching cycle in the first mode and to integrate the integration current and the feedforward current over an entire switching cycle in the second mode.

17. The control circuit of claim 16, wherein in the second mode:

a) during a conduction period of a first power transistor of the resonant converter, a direction of the feedforward current generated by the feedforward circuit equals a direction flowing into the integration capacitor; and b) during a conduction period of a second power transistor of the resonant converter, a direction of the feedforward current generated by the feedforward circuit equals a direction flowing out of the integration capacitor, c) wherein the first power transistor and the second power transistor are connected in series between an input terminal and a reference ground.

18. The control circuit of claim 13, wherein the driving control circuit is configured to compare the charge feedback signal against the first threshold signal to generate a signal for controlling a turn-off moment of the power transistor in the resonant converter.

19. The control circuit of claim 16, wherein:

a) the driving control circuit is configured to generate a signal for controlling a turn-off moment of a first power transistor in the resonant converter when the charge feedback signal rises to be greater than a second threshold signal, and to generate a signal for controlling the first power transistor to be turned on when the charge feedback signal falls to be less than a third threshold signal;

b) the second threshold signal is a difference between a bias signal and the first threshold signal;

c) the third threshold signal is a sum of the bias signal and the first threshold signal; and d) the first power transistor and the second power transistor are connected in series between an input terminal and a reference ground.

* * * * *